United States Patent [19]

Kaliebe

[11] 4,038,587

[45] July 26, 1977

[54] CERAMIC DISC CAPACITOR AND METHOD OF MAKING THE SAME

[75] Inventor: Kenneth J. Kaliebe, Cedarburg, Wis.

[73] Assignee: Sprague Electric Company, North Adams, Mass.

[21] Appl. No.: 606,699

[22] Filed: Aug. 21, 1975

[51] Int. Cl.² .............................................. H01G 4/06
[52] U.S. Cl. ................................... 361/321; 29/25.42; 361/305
[58] Field of Search ........................ 317/261, 242, 258; 29/25.42

[56] References Cited

U.S. PATENT DOCUMENTS

| 3,456,170 | 7/1969 | Hatch | 317/261 |
| 3,491,275 | 1/1970 | Poppolo | 317/261 X |
| 3,581,167 | 5/1971 | Veater | 317/261 |
| 3,585,472 | 5/1972 | Dorwfeld | 317/261 |
| 3,882,059 | 5/1975 | Elderbaum | 317/261 |

FOREIGN PATENT DOCUMENTS

| 895,568 | 5/1962 | United Kingdom | 317/258 |

Primary Examiner—E. A. Goldberg
Attorney, Agent, or Firm—Connolly and Hutz

[57] ABSTRACT

At least one of the metallized surfaces of a ceramic disc is partially coated with a solder resist. A terminal is secured to the uncoated portion of the metallized surface by means of solder which does not adhere to the coated portion. The capacitor is trimmed to desired capacitance by abrading away the resist and the underlying metallization.

8 Claims, 4 Drawing Figures

CERAMIC DISC CAPACITOR AND METHOD OF MAKING THE SAME

BACKGROUND OF THE INVENTION

This invention relates to a ceramic disc capacitor, and more particularly to such a capacitor having provisions for adjustment of capacitance.

A typical prior art ceramic disc capacitor utilizes a disc of dielectric ceramic material, such as barium titanate, having electrodes on the opposite flat surfaces of the disc, such as by firing silver compositions onto the surfaces. It is conventional to provide terminations to such a capacitor by dipping the silvered ceramic disc into solder, which adheres only to the metallized surfaces, and securing lead wires in the solder deposits. It has long been customary to provide a protective outer jacket for ceramic disc capacitors, as by dipping the units in a phenolic or by molding the units in an epoxy. However, it has become an established practice to employ uncoated ceramic disc capacitors in electronic subassemblies which are later provided with an overall protective package. Use of ceramic disc capacitors in electronic circuits frequently requires a precision of capacitance that is beyond the state of the art, and heretofore has required that rather elaborate trimming or adjustment procedures be employed.

SUMMARY OF THE INVENTION

An object of the present invention is the provision of a ceramic disc capacitor that permits ready adjustment of capacitance.

Another object is the provision of ceramic disc capacitors that can be adjusted after inclusion in an electronic circuit.

In accordance with this invention a ceramic disc capacitor having metallized surfaces on opposite faces of the ceramic disc has a portion of at least one of the metallized surfaces covered with a material that resists adhesion of solder and which material is readily removed along with the underlying metallized surface to provide ready adjustment of the capacitance of the capacitor.

DESCRIPTION OF THE PREFERRED EMBODIMENT

Figure 1:
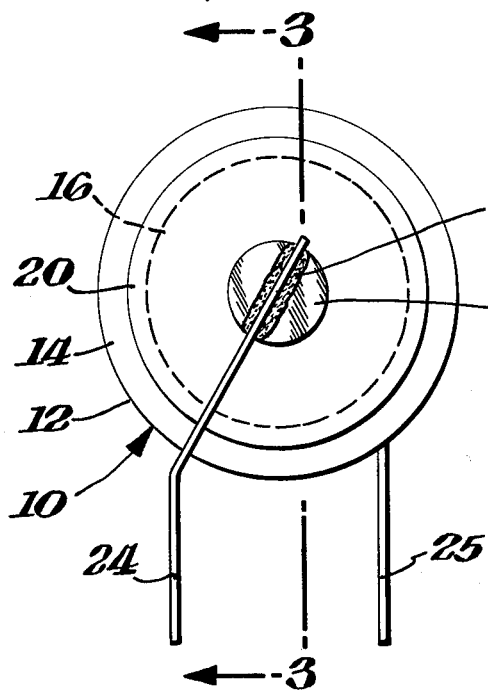
FIG. 1 is an elevational view of one surface of the capacitor of this invention.
Figure 2:
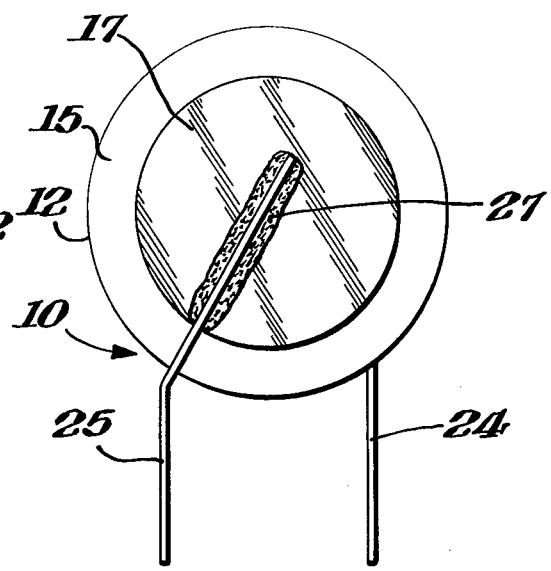
FIG. 2 is an elevational view of the opposite surface of the capacitor.
Figure 3:
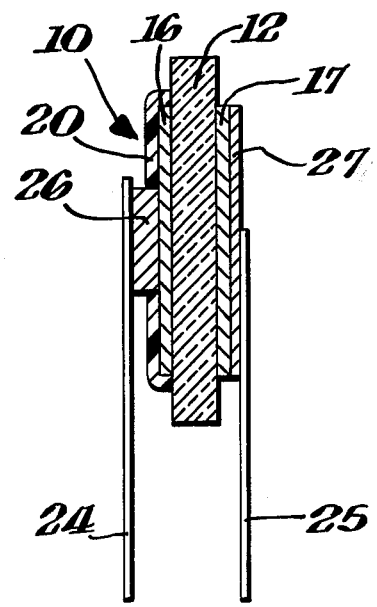
FIG. 3 is a cross-section of the capacitor taken along line 3—3 in FIG. 1.

The drawing shows a capacitor 10 having a disc-shaped body 12 of dielectric ceramic material having opposed major flat surfaces 14 and 15. The surfaces 14 and 15 are provided with electrodes 16 and 17, as for example by screening commercial silver compositions thereon and later firing the compositions to leave an electrode of silver firmly affixed to the surfaces 14 and 15, respectively. The electrodes 16 and 17 should cover a substantial portion of the surfaces 14 and 15 so as to provide maximum electrode overlap while avoiding any bridging between the electrodes around the rim of the disc 12. The extend of capacitance overlap provided by electrodes 16 and 17 offers the maximum capacitance that can be obtained from capacitor 10. Any adjustment or trimming of capacitor 10 will result in a decrease in the capacitive overlap between the electrodes, and therefore a decrease in the capacitance.

One or both of electrodes 16 and 17 is provided with a coating 20 in the form of an annulus leaving a central opening 22 through which the electrode is available for the attachment of a suitable terminal member. For the sake of illustration of this invention, only electrode 16 is shown with a coating 20. However, it should be understood that the oppositely disposed electrode 17 could aalso be provided with a similar coating 20.

It should be further understood that the annular shape of coating 20 is the preferred embodiment because of convenience of registration on a circular surface. However, coating 20 could take the form of a segmental coating, and the segments on the opposite surfaces of the disc need not be in registration. It is important in the application of coating 20 that sufficient surface of the electrodes be left uncovered to facilitate application of terminal leads by means of conventional soldering procedures.

The preferred embodiment is shown with coating 20 extending beyond the periphery of electrode 16 so as to seal the edges of the electrode against moisture and other contaminants, thereby enhancing the utility of the capacitor in an unprotected state, as in an electronic circuit where adjustment is made after the circuit is assembled.

A preferred embodiment of this invention utilizes phenolic material for coating 20. However, any other hard material to which solder will not adhere is suitable as a material for coating 20. It is important that the coating 20 be of hard material so as to be readily abraded away along with the underlying electrode material during adjustment of the capacitor. This requirement for a hard coating eliminates any rubbery materials such as polyurethanes in situations where powder abrasive removal is to be employed, because abrasive particles tend to bounce off rubbery materials as the energy is absorbed therein. It is preferred that coating 20 be of insulative material so as not to disturb the capacitive relationship between electrodes 16 and 17.

Conventional hockey-stick leads 24 and 25 are affixed to the uncoated surfaces of electrodes 16 and 17 by solder deposits 26 and 27, as by clamping the leads to the disc and dipping in any solder bath known to the ceramic capacitor art. The solder adheres only to the exposed metal surfaces of the leads and the electrodes, and does not adhere to coating 20 or the ceramic body 12. For those capacitors that are to be employed without an outer protective jacket, it is particularly important that the uncoated portion of the electrode be of sufficient area to permit firm anchoring of the lead wire by the solder.

Figure 4:
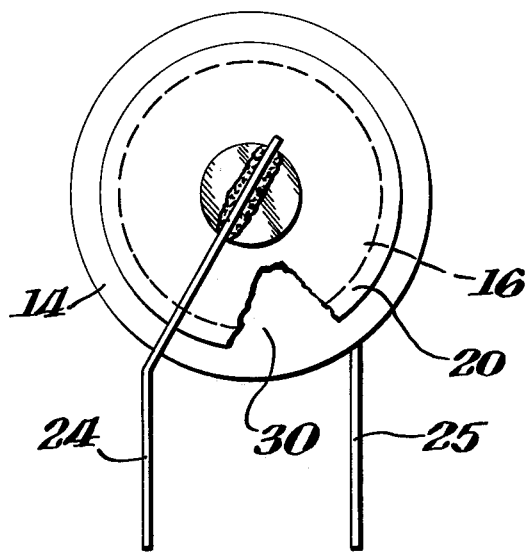
FIG. 4 is an elevational view of the capacitor after adjustment.

FIG. 4 shows capacitor 10 after having been subjected to adjustment of capacitance by removal of a portion 30 of electrode 16 and overlying coating 20. The portion 30 of electrode 16 that is removed in the adjustment procedure is a portion that overlies electrode 17 on the opposite face of disc 12. The removal in the preferred embodiment is accomplished by air abrasive techniques in which a stream of abrasive material, e.g. powdered walnut shells or other known abrasive materials, is propelled against the surface to be removed.

Capacitor 10 can be adjusted either in a capacitance test fixture at the end of a production line, or alternatively the adjustment may be made after the capacitor 10 has been inserted in an electronic circuit. While it is an objective of this invention to produce a device that is especially adapted for adjustment by an end user in an electronic circuit, it will be recognized that adjustment by the manufacturer of the capacitor permits the sale of a close tolerance line of ceramic capacitors that are provided with the usual insulative protective outer jackets known to the capacitor art.

The preferred embodiment of this invention has been described as a disc capacitor, whereas it will be understood by those skilled in the art that the shape of the dielectric is chosen for convenience in processing, and is not dictated by the adjustment feature of this invention. Other shapes known to the capacitor art, such as rectangular slabs or cubes having electrodes on several pairs of opposed faces, are readily adapted to the use of the adjustment teachings of this invention.

What is claimed is:

1. A capacitor comprising a dielectric body having opposed surfaces, a first electrode on one of said surfaces, a second electrode on the other of said surfaces in substantial capacitive overlap with said first electrode, a coating of abradable hard insulative solder-resistant material overlying a first portion of said first electrode, a second portion of said first electrode being uncoated by said coating, terminal members attached to said second portion and to said second electrode by solder layers which physically contact and adhere to said second portion and said second electrode, a part of said one surface of the dielectric body overlying said second electrode being free of said coating and said first electrode, said first portion and said part being free of solder.

2. The capacitor of claim 1 wherein said coating extends beyond the periphery of said first electrode into contact with said body.

3. The capacitor of claim 1 wherein said body is a ceramic disc, said electrodes are silver deposits, and said coating is of an insulative material abradable by powder abrasion.

4. The capacitor of claim 1 wherein said first portion is a major portion of said first electrode, and said second portion is a minor portion of said first electrode.

5. The capacitor of claim 1 wherein said body is a ceramic disc with said electrodes on the opposed flat surfaces of said disc, and said abradable coating is an annulus with said second portion in the open center of said annulus.

6. A method of making a ceramic capacitor comprising depositing electrodes in capacitive overlapping relationship on a portion of the opposed surfaces of a ceramic body, applying an abradable coating of hard insulative solder-resistant material over a first portion of at least one of said electrodes and leaving a second portion of said one electrode uncoated as well as a part of the surface of the ceramic, attaching terminations to said second portion and to the other of said electrodes by solder physically contacting and adhering to said second portion and to the other of said electrodes, said abradable coating being unwettable by said solder so as to leave said first portion free of solder, abrading away a part of said abradable coating and an underlying part of said first portion in capacitive overlap with said other electrode until the desired extent of capacitive overlap is achieved so as to provide a desired capacitance between said terminations.

7. The method of claim 6 wherein said abradable coating is an insulative phenolic material, and said abrading away is by an air stream of abrasive material directed at said part.

8. The method of claim 6 wherein said ceramic body is a disc with said electrodes being deposited on the opposed flat surfaces of said disc, and said abradable coating is an annulus with said second portion being in the open center of said annulus.

* * * * *